US011896460B1

(12) United States Patent
Nafar et al.

(10) Patent No.: US 11,896,460 B1
(45) Date of Patent: Feb. 13, 2024

(54) DEVICE FOR PRECISE INSERTION OF A DENTAL IMPLANT

(71) Applicants: Samir Nafar, Holon (IL); Yosef Ben Yosef, Holon (IL)

(72) Inventors: Samir Nafar, Holon (IL); Yosef Ben Yosef, Holon (IL)

( * ) Notice: Subject to any disclaimer, the term of this patent is extended or adjusted under 35 U.S.C. 154(b) by 0 days.

(21) Appl. No.: 17/897,873

(22) Filed: Aug. 29, 2022

(51) Int. Cl.
*A61C 8/00* (2006.01)
(52) U.S. Cl.
CPC ...... *A61C 8/0089* (2013.01); *A61C 2204/002* (2013.01)
(58) Field of Classification Search
CPC .... A61C 8/0089; A61B 17/8875–8894; B25B 23/18
See application file for complete search history.

(56) References Cited

U.S. PATENT DOCUMENTS

| 4,302,797 A * | 11/1981 | Cooper | B25B 23/18 |
| | | | 362/109 |
| 2013/0304069 A1 * | 11/2013 | Bono | A61B 17/1671 |
| | | | 606/80 |
| 2016/0354169 A1 * | 12/2016 | Suttin | A61B 34/30 |

FOREIGN PATENT DOCUMENTS

KR 102260888 * 6/2021

OTHER PUBLICATIONS

KR 102260888 English Translation (Year: 2021).*

* cited by examiner

*Primary Examiner* — Cris L. Rodriguez
*Assistant Examiner* — Drew S Folgmann
(74) *Attorney, Agent, or Firm* — The Roy Gross Law Firm, LLC; Roy Gross

(57) ABSTRACT

The present invention relates to an implant-driver tool and method of using same for proper insertion of implants into a predrilled drillhole in a bone.

15 Claims, 11 Drawing Sheets

DEVICE FOR PRECISE INSERTION OF A DENTAL IMPLANT

FIELD OF THE INVENTION

The present invention relates to an implant-driver, especially a dental-implant-driver, for enabling easy and simple positioning of an implant just below the bone surface or surface-level, especially a dental implant, and method of use, especially flapless dental implant surgery.

BACKGROUND OF THE INVENTION

Today, dental implants are commonly used as a way to provide permanent artificial teeth to patients that lost some or all of their teeth. Implant dentistry involves the restoration of one or more teeth in a patient's mouth using artificial components, such as dental implants and a prosthetic tooth and/or an abutment that is secured to the dental implant: the dentist drills into the patient's jawbone and implants an artificial tooth root, i.e., a dental implant. Then, natural bone, by a process called osseointegration, built against with this implant. An artificial crown can then be placed onto the implant.

There are two main implantation processes: one in which the dentist first opens the gums ("flap-lifting"/"dental flap-lifting") and expose the bone, and then drills into the bone, and another in which the dentist drills without lifting the gums (i.e., by creating a small opening in the gums) and then into the bone (flapless surgery).

The implantation process that includes flap-lifting greatly facilitates the operation by providing the dentist with a full and clear vision of the bone. However, the exposure of a bone at the site of the transplant and its surroundings has various negative effects, such as increased loss of bone volume in the exposed area, a more complex and longer recovery that includes risk of increased local infection/hemorrhage/nerve damage/receding gums in teeth adjacent to the exposed area, which may cause an aesthetic deformity/significantly longer treatment time, etc.

Due to these negative effects, a need arose to develop minimally invasive ways to perform flapless dental implants surgery. For that, a variety of techniques and tools have been developed, such as computer-guided surgical matrix to perform transplants without opening the gums, while trying to minimize the spatial uncertainty that occurs during drilling and during placement of the implant thereafter.

One example is the use of computerized surgical guides that have become a reliable method for performing implant surgery. These guides use computerized tomography and three-dimensional (3D) materials fabrication technology (e.g., computer controlled steriolithography, computer numerical control (CNC) machining, and the like) to create a custom implant drilling guide. This way, the guide provides control of the buccolingual, mesial-distal and vertical placement of the surgical drills, and optionally placement of the implants.

Notably, most methods today are aimed at providing a precise drilling, taking into consideration that once the drilling is complete, the insertion of the implant is straight forward. However, this is not accurate, since the insertion of the implant possess its own complications, and as such the focus should be on the insertion of the implant and its final placement in place to enable proper anchoring and bone-wrapping in a most conventional and appropriate way for long-term survival of the implant in the bone.

Known methods and applications for performing flapless dental implantation, have various disadvantages, such as: (a) incorrect positioning of the surgical guide due to, e.g., inadequate experience of the dentist, placing the guide on unstable soft gums, inaccurate match between the guide and the gums, presence of teeth that interrupt the guide, etc.; (b) poor bone density or too thin bone that may lead to bone fracture after drilling when inserting the implant; (c) vanishing of the bone during drilling therein; and (d) insufficient rigidity of the bone to enable full compliance between the drilled hole and the implant insertion pathway; etc.

In view of these and other reasons, even if the dentist makes a perfect drillhole, the insertion of the implant into the drillhole might result with inadequate placement of the implant and subsequently to premature loss of the implant. Such inadequate/incorrect placement of the implant may be unnoticed by the dentist for various reasons: (a) in the vertical orientation: certain areas in the implant may remain in a supra-skeletal location due to the implant not being fully inserted into the bone (i.e., too shallow- illustrated in FIG. 1A), which will lead to increased risk of infection and aesthetic problem, or inadequately insertion (i.e., to deep- illustrated in FIG. 1B), which will lead to cortical bone loss, optionally pockets and preimplantitis, as well as risk to nearby anatomical structures such as the mandibular nerve and the maxillary sinus; and more likely (b) in the horizontal orientation: the implant may be located outside a bone frame that can provide sufficient biological support. This can happen due to, e.g., a thin ridge bone along the entire implant or due to an oval ridge shaped bone while the cross-sectional shape of the implant's head is rectangular (see illustrations in FIGS. 2A and 2B).

The well-known and experienced method of positioning the implant using tactile contact by an insert around the implant thread during its insertion is bearing the same risks. The reason is the subjectivity of the pressure that must be applied by the dentist to get a correct and complete reading of the triangular spatial image around the head and body of the implant.

The above-described conditions may lead to implant rejection and failure of the surgical procedure in the short term as well as to an earlier-than-expected prosthetic failure in the long run due to tissue-failure of the supporting tissues around the implant.

In implants performed in the aesthetic area of the front of the mouth, the location of the implant outside the bone frame may also lead to severe aesthetic defect even if the implant is osteo-integrated in a way that allows for biomechanical restoration.

Therefore, there is an unmet need for developing new, simple and cost-efficient ways for inserting a dental implant into a drillhole in an accurate manner The present invention provides an implant-driver that enables to overcome all of the above disadvantages and more, as well as a method of using same.

SUMMARY OF INVENTION

In a first aspect, the present invention provides an implant-driver tool for driving an implant into a drillhole predrilled into the bone, the tool comprising: (a) a distal driver section mateable (i.e., capable of being mated or joined together) with said implant; and (b) a light source and light exit point at said distal driver section, wherein said light source is designed to emit light via said light exit point in a forward direction of said distal driver section, i.e., towards essentially a mating point between said distal driver section and said implant's head.

In a second aspect, the present invention provides a method for inserting an implant into an implant-socket/drillhole drilled into a bone while decreasing the risk of inadequate insertion thereof, said method comprising the steps of: (i) drilling a drillhole into the bone in a suitable depth and angle; (ii) using an implant-driver of the invention for screwing said implant into said drillhole until identifying that a light emitted from said implant-driver is gone, which is indicative that the implant has reached its proper depth and is in an accurate horizontal orientation; and (iii) removing the implant-driver.

In a third aspect, the present invention provides an implant kit that comprises an implant-driver tool of the invention and any other implant-related tool, such as drills, punch tool, implants, ratchet, a power source, charger, computer guided implantology, etc.

BRIEF DESCRIPTION OF DRAWINGS

FIG. 1A of an insufficient insertion of the implant into the bone; and FIG. 1B of a too-deep insertion of the implant into the bone.

FIGS. 4A and 4B are 3-dimentional illustration of the tool from two angles; and FIG. 4C is a cross-sectional side-view of the implant-driver tool.

FIG. 6A illustrates the inner components that are extractable from an outer shell that is illustrated in FIG. 6B.

DETAILED DESCRIPTION OF THE INVENTION

Figure 1A:
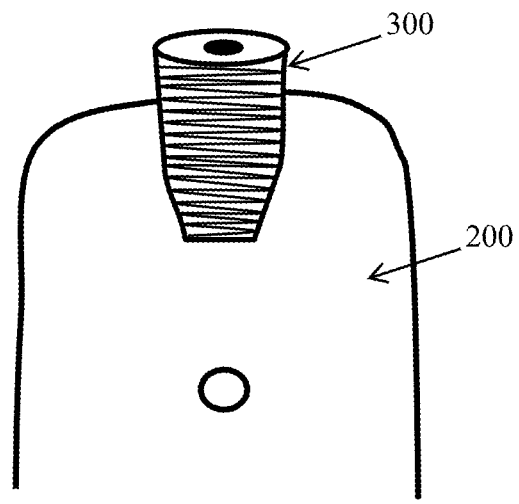
FIGS. 1A-1B illustrate two possible vertical orientation implant displacements.

Dental implants have become more and more common, and more dentists are now required to use dental implants during their practice. This is a challenging procedure, especially to those of little experience and skill.

The present invention intends to provide the novice implant-dentist, as well as the skilled and experienced one, an implant-driver that enables easy and simple identification that an implant has been properly placed in its drillhole.

To assist the dentist/physician to reduce the risks accompanying dental implantation resulting from inadequate field-of-vision of the surgical site, the present invention provides an implant insertion-driver that is based on the relative opacity differences between the bone and the soft tissue (such as the jawbone and gums) during the insertion of the implant into its drillhole (i.e., after the drilling of the hole).

Accordingly, in a first aspect, the present invention provides an implant-driver tool for driving an implant into a drillhole in a bone to a position just below the bone surface or surface-level, the tool comprising: (a) a distal driver section (106) mateable (i.e., capable of being mated or joined together) with said implant, e.g., a cavity therein; and (b) a light source (102) and light exit point (107) at said distal driver section, which is optionally integral, wherein said light source (102) is designed to emit light via said light exit point (107) essentially in a forward direction of said distal driver section, i.e., in the direction of the mating point between said distal driver section (106) and said implant (200).

In certain embodiments of the above implant-driver tool, the light exit point (107) comprises a transparent seal that allows light to pass therethrough outwardly while preventing moisture, water and other contaminants from reaching inner components of said implant-driver tool, thereby enabling cleaning and disinfecting of the implant-driver tool using any known technique, and preventing penetration of contaminants into the interior of the implant-driver tool.

The basic principle of the present invention is the use of a (thin) light-strip emitting from the implant-driver tool (100) in essentially about a 360° (e.g., 4 light emitting sections, each one of about 90°; 5 light emitting sections, each one of about 72°; 6 light emitting sections, each one of about 60°; etc.) around the implant's head during insertion of the implant into its implant-socket/drillhole. Due to the light-permeable properties of the soft tissue surrounding the bone (200), such as the gums and periosteum, the light emitted from the implant-driver is noticeable therethrough during insertion of the implant (300) into the drillhole. However, once the driver reaches the light-impermeable bone, light is no longer visible/noticeable via the soft tissue, which means that the implant has reached its desired insertion depth and is positioned in a desirable horizontal and vertical orientation related to the drillhole. This means that as long as the implant's head (to which the implant-driver tool (100) is attached) did not reach the bone, light is visible through the soft tissue (e.g. gums and periosteum), but when the implant reaches its designated depth and the implant-driver tool (100) reaches the bone, the light is blocked by the bone, which indicates to the physician/dentist that the implant has reached its desired/right depth and angle in the bone.

The concept of the invention is that as long as the implant has not been inserted deep enough, light emitting from the implant-driver tool (100) is visible through the soft tissue surrounding the bone (e.g., the gums and periosteum around the jawbone) during the insertion. This is since the implant's head is not leveled with the outer surface of the bone: since the light is emitted forwardly from the driver's distal section, when the implant has not been inserted deep enough, light is scattered sideways and passes through the soft tissue that is light-permeable (see light scatter illustration in FIG. 7). However, when the implant reaches the desired depth, the driver's distal section (i.e. the point from which the light exits the tool) reaches a point at which it is in contact-with or close-proximity to the bone, which is light-impermeable, thereby preventing light from scattering sideways.

The fact that light is visible during the insertion of the implant into the bone/implant-socket may also serve as an indication of improper insertion, e.g., that the implant has been inserted in a bad angle, close to the bone's edge according to the premade drillhole, or that it needs only further insertion into the bone. The idea is that if light is visible via the soft tissue, the implants' head is not properly in-line with the bone's surface/edge or is not completely embedded in the bone. In addition, the disappearance of the light is indicative that the implant has reached its proper and right insertion depth and thus indicates to the implanter to stop the implant's insertion into the bone.

Accordingly, in certain embodiments of the implant-driver tool (100) of the invention, when the implant (300) is driven by said implant-driver tool (100) into the bone (200), light emitted from said tool (100) is visible through the patient's gums and periosteum until said implant reaches a sufficient depth in the bone, at which point the bone blocks the light and no light is visible, thereby indicating that the implant has reached its precise insertion point just below the bone surface or surface-level in terms of depth and angle relative to the drillhole.

Any light source (102) can be used in the implant-driver tool (100) of the invention. In specific embodiments, the light source is LED. In certain embodiments, the light source is designed to emit light in about 360° around implant's head during its insertion into an implant-socket.

Figure 7:
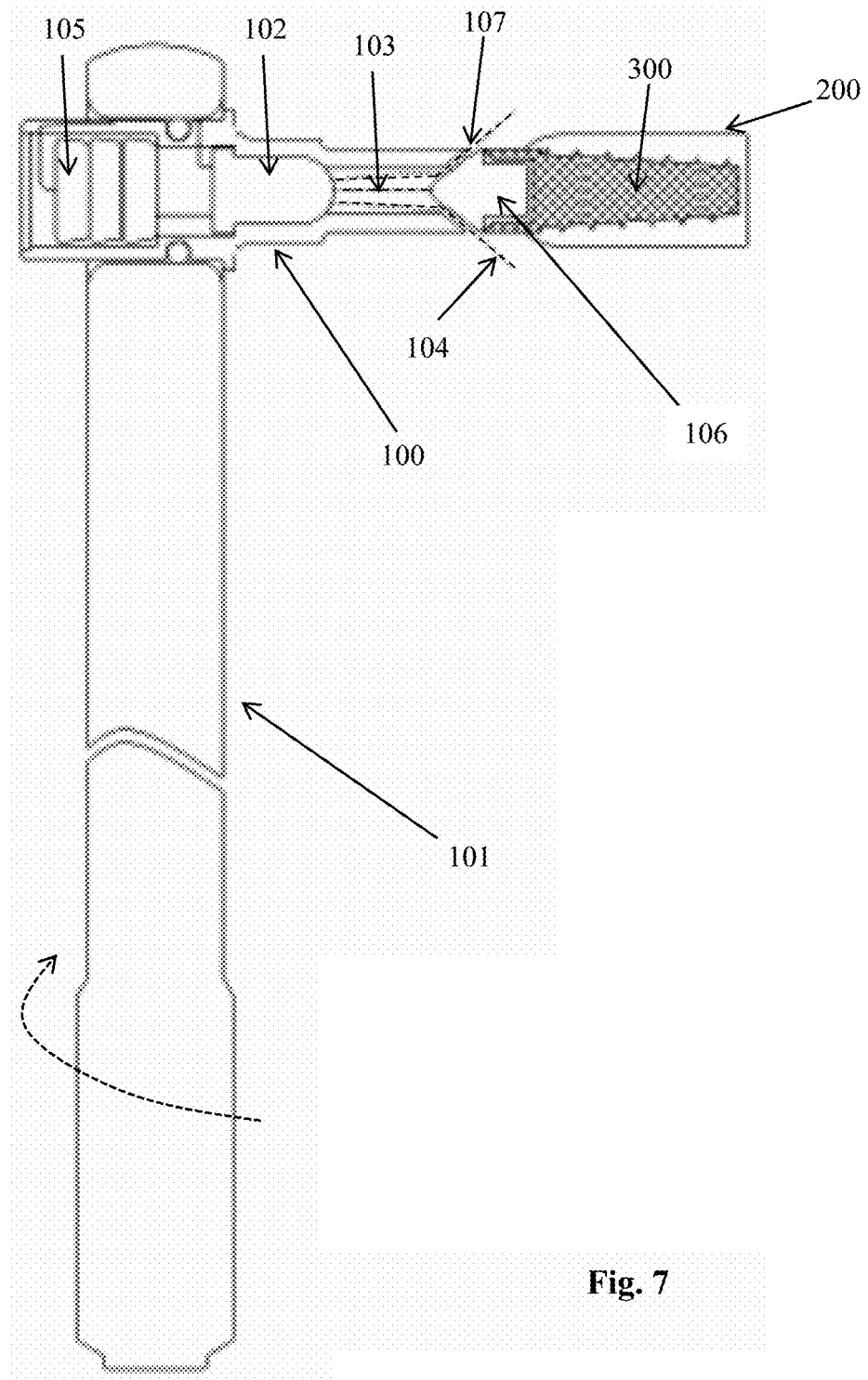
FIG. 7 illustrates the use of an implant-driver tool of the invention for inserting an implant into a drillhole in a bone, illustrating a visible light scatter while the implant has not reached a desired depth.

The light source (102 may comprise 1, 2, 3, 4, 5, 6, 7, 8, 9, 10 or more light sources (see FIG. 7 illustrating 4 light sources), or may comprise a single light source that is split into several light origins, e.g., using two or more optic fibers connected to said single light source.

In certain embodiments, the light-strip emitting from the implant-driver is emitted in an angle around the tool of essentially about a 360°, about 320°, about 300°, about 280°, about 260°, about 240°, about 220°, about 200°, about 180°, about 160°, about 140°, about 120°, about 100°, or about 80°. In specific embodiments, when the light-strip emitting from the implant-driver tool (100) is not emitted in an essentially about a 360°, the implant-driver tool (100) is configured to emit the light-strip in a direction that is towards the soft tissue that faces the physician/dentist to enable visualization thereof (and towards the back area behind the bone where it might not be seen/visible).

In certain embodiments, light emitting from the light source (102) passes through a light conduit (103) within the tool. In alterative or added embodiments, a reflector is used to split and/or spread the light beam, either as it passes through the light conduit (103), and/or just before exiting the tool through the light exit point(s) (107) at the distal end of the tool.

The light source (102) is operated by a power source (105). In certain embodiments, the power source is external. In alternative embodiments, the implant-driver tool comprises an internal power source, which is optionally rechargeable. In further alternative embodiments, the power source is an internal dynamo-like device so that when the physician/surgeon/dentist turns the tool's handle for screwing the implant into its drillhole/implant-socket, electric power is generated and activates the light source.

The light source may be activated automatically, e.g., by attaching the driver (100) to the implant (300) or to the ratchet/metal-handle (101) (e.g., using a magnetic field, or due to an electric circle closure thanks to the attachment to the metal implant/driver/handle) or by disconnecting the driver (100) from a charger, or by the rotation function of the tool (100) or the ratchet/handle (101) during insertion of the implant. Alternatively, in certain embodiments, the implant-driver tool (100) according to any of the embodiments above further comprises a switch to turn the light on and off.

In certain embodiments, the present invention provides an implant-driver tool (100) for precisely driving an implant (300) into a drillhole in a bone (200), the tool (100) comprising: (a) a distal driver section (106) mateable with said implant; (b) an integral light source (102) and light exit point (107) at said distal driver section; (c) an integral power source (105); and (d) optionally a light switch, wherein said light source is designed to emit light via said light exit point (107) essentially in a forward direction of said distal driver section, i.e., towards a mating point between said distal driver section and said implant. In specific embodiments thereof, the light source is LED. In further specific embodiments, the light source emits a (thin) light-strip about 180° to about 360° around the implant's head during insertion of the implant into its implant-socket/drillhole.

In certain embodiments, the implant-driver tool (100) according to any of the embodiments above is a single unified unit. In alternative embodiments, it can be dismantled, i.e. by removing its inner components from its outer shell, e.g. for cleaning, battery replacement, repairs, etc.

In specific embodiments of the implant-driver tool (100) according to any of the embodiments above, the bone is a jawbone and said implant is a dental implant designed to be inserted into a drilled implant-socket in said jawbone; and optionally said light source (102) is designed to emit light in about 360° around implant's head during its insertion into an implant-socket. In further specific embodiments, the implant-driver tool (100) further comprises a rechargeable integral power source (105).

The implant-driver tool (100) of the invention can be fabricated in any known technology and can be made of any suitable material, more particularly any suitable rigid material which enables easy insertion of an implant pin into an implant-socket/drillhole. In specific embodiments, it is made of medical graded material such as stainless steel or titanium. The term "medical graded material" as used herein refers to any biocompatible rigid material which can be cleaned and sanitized by any suitable procedure/technique. In certain embodiments, the implant-driver tool of the invention is made of a stainless steel, e.g., stainless steel 304, 304L, 316 or 316L. In other embodiments, it is made of titanium or a titanium alloy, preferably those that are biocompatible. In other embodiments, it is made of any suitable carbon composite, or other suitable composites. Or any combination thereof.

After sterilization, the implant-driver tool of the invention can be contained in sealed packaging until use. Notably, sterilization can be done to the entire tool (100), e.g. when it is a single unified unit or is sealed, or can be done only to the tool's outer shell after removal of its inner components.

In certain embodiments, the implant-driver tool (100) of the invention is disposable or reusable. In certain embodiments, the tool's inner components are reusable and the tool's outer shell is disposable, such that the dentist/surgeon only needs to replace the outer shell after each use.

In certain embodiments, the present invention provides a reusable dental implant-driver tool (100) made of medical graded material for precisely driving an implant (300) into a drillhole in a bone (200), the tool (100) comprising: (a) a distal driver section (106) mateable with said implant; (b) an integral LED light source (102) designed to emit a (thin) light-strip via a light exit point (107) about 180° to about 360° around the implant's head essentially in a forward direction of said distal driver section, i.e., towards a mating point between said distal driver section and said implant during insertion of the implant into its implant-socket/drillhole; (c) an integral power source (105); and (d) a light switch.

In another aspect, the present invention provides an implant kit that comprises the implant-driver tool according to any of the embodiments above. In specific embodiments, the kit further comprises one or more other implant-related tools, such as one or more drills, a punch tool, one or more implants, a ratchet/handle (101) designed to hold said implant-driver tool (100), a power source, a charger (for charging the power source (105) of the tool), a computer guided implantology, etc., or any combination thereof. Notably, the implant-driver tool (100) according to any of the embodiments above is mateable with said implants and said ratchet/handle (101). In specific embodiments, the kit further comprises an instruction manual.

In certain embodiments of the kit, the implant-driver tool comprises an integral power source, and the kit further comprises a cable or charger for charging the integral power source.

The kit can be used for implanting any type of implant in any type of bone. For instance, the implants can be dental implants, and the kit is thus a dental implantation kit.

In certain embodiments, for the sake of order and ease of use, the kit comprises various dental drills and implants of either identical or different lengths and/or diameters stored in a special container, separated according to their length and/or diameter.

Accordingly, in certain embodiments, the kit of the present invention further comprises a designated container having a body and a lid, for holding said implant-driver tool and any other implant-related tool(s). The container may be made of any suitable material, but it is preferably made of a material that is suitable for medical use and can be sterilized using a standard sterilization method. Such containers may be made of medical graded materials such as, without being limited to, stainless steel, titanium, titanium alloys, plastic, and polycarbonates.

In certain embodiments, the present invention provides a dental implant kit that comprises: (i) one or more dental implants; and (ii) a dental implant-driver tool mateable with said one or more implants, said tool is made of medical graded material for precisely driving an implant into a drillhole in a bone, the tool comprising: (a) a distal driver section; (b) an integral LED light source designed to emit a (thin) light-strip via a light exit point (107) about 180° to about 360° around the implant's head essentially in a forward direction of said distal driver section, i.e., towards a mating point between said distal driver section and said implant during insertion of the implant into its implant-socket/drillhole; and (c) an integral power source. In specific embodiments, the kit further comprises an instruction manual. In specific embodiments, the dental implant-driver tool is reusable. In further or alternative embodiments, the implant-driver tool comprises a light switch.

In certain embodiments, the present invention provides a dental implant kit that comprises: (i) a handle/ratchet (101);
(ii) a dental implant-driver tool mateable with said handle/ratchet, said tool is made of medical graded material for driving an implant into a drillhole in a bone just below the bone's surface or surface-level, the tool comprising: (a) a distal driver section; (b) an integral LED light source designed to emit a (thin) light-strip via a light exit point (107) about 180° to about 360° around the implant's head essentially in a forward direction of said distal driver section, i.e., towards a mating point between said distal driver section and said implant during insertion of the implant into its implant-socket/drillhole; and (c) an integral power source. In specific embodiments, the kit further comprises an instruction manual. In specific embodiments, the dental implant-driver tool is reusable. In further or alternative embodiments, the implant-driver tool comprises a light switch.

In another aspect, the present invention provides a method for inserting an implant into an implant-socket/drillhole drilled into a bone without the risk of inadequate insertion thereof.

In yet another aspect, the implant-driver tool (100) according to any of the embodiments above is used in a method for inserting an implant into an implant-socket/drillhole drilled into a bone while reducing the risk of inadequate insertion thereof.

In another aspect, the implant-driver tool (100) according to any of the embodiments above is used for inserting an implant into an implant-socket/drillhole drilled into a bone while dramatically reducing and essentially eliminating the risk of inadequate insertion thereof.

In certain embodiments, the above method comprises the step of using an implant-driver tool (100) according to any of the embodiments above for screwing an implant into a predrilled implant-socket/drillhole until identifying that a light emitted from said implant-driver tool (100) is gone, which is indicative that the implant has reached its proper depth and is in an accurate horizontal orientation relative to the premade drillhole.

In certain embodiments, the method according to any of the embodiments above further comprises the steps of: (i) first drilling a drillhole into the bone in a suitable depth and angle based, e.g., on X-ray or other imaging method and/or using a guide; (ii) turning on the light within the implant-driver tool; and finally, after placing the implant in place, (iii) removing the implant-driver. In certain embodiments, the screwing of the implant into its drillhole is carried out first with a regular driver, and towards the end of the screwing replacing the driver with the implant-driver tool (100) of the invention to see the light and obtain a precise placement of the implant. In certain embodiments, the method further comprises any one or more of the following steps: removing excess bone around the implant after insertion/screwing; placing a healing cap; placing a cover surgical screw; or any other related implementation step, such as dental implant abutment with temporary crown/bridge/denture.

In certain embodiments, the attachment of the implant-driver tool (100) of the invention according to any of the embodiments above to the implant is performed by any suitable means, e.g., by a groove in the implant mateable with a protrusion/bulge at the edge of the implant-driver, by friction, by a groove in the implant-driver mateable with a protrusion/bulge at the implant's head, by screwing, by a magnet, by vacuum, or any combination thereof. The groove and compatible protrusion/bulge may be of any shape and size, such as triangle, hexagonal, cylindrical, star-shaped, etc.

The method of the present invention enables the user to know if and when an implant has been inserted fully into its implant-socket in a flapless implant surgery, while reducing the risk of misplacing the implant in a wrong angle, depth or position in the bone, etc.

Thus, after drilling the implant-socket, the physician/dentist/surgeon selects a suitable implant according to the drillhole's diameter and depth, according to the bone's density, and any other suitable characteristic, and then uses the implant-driver tool of the invention to safely insert the implant into the drillhole until no light is visible through the soft tissue, which is indicative that the implant has reached suitable depth and is not extending or bulging out of the bone in any point. If the implant had been inserted into its planned depth, but light is still visible, the physician/dentist/surgeon would know that something went wrong, e.g., that the implant-socket has been drilled in an inaccurate depth or angle, or close to the bone's edges, or that the bone cracked, etc., and would thus reevaluate the implant insertion process.

In certain embodiments of the method according to any of the embodiments above, the bone is a jawbone and the implant is a dental implant designed to be inserted into a drilled implant-socket in the jawbone.

Unless otherwise indicated, all numbers used in this specification, are to be understood as being modified in all instances by the term "about". Accordingly, unless indicated to the contrary, the numerical parameters set forth in this specification are approximations that may vary by up to plus or minus 10% depending upon the desired properties to be obtained by the present invention.

Specific, non-limiting, embodiments of the invention will now be illustrated with reference to the accompanying figures.

Figure 1B:
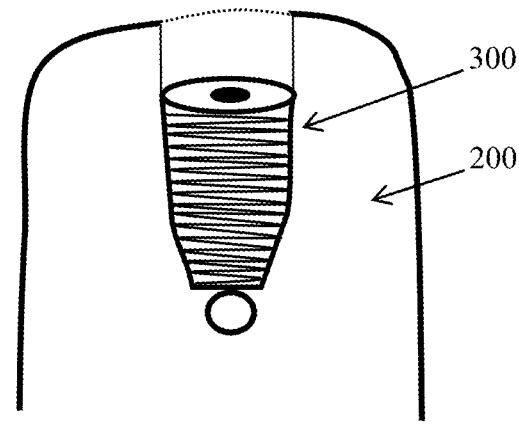
Figure 2A:
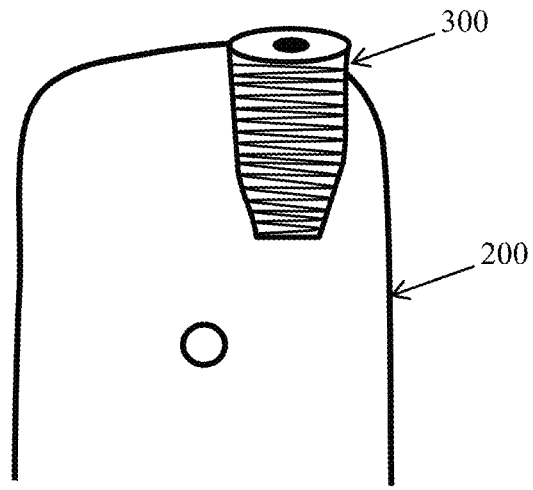
FIGS. 2A-2B illustrate two possible horizontal orientation implant displacements.
Figure 2B:
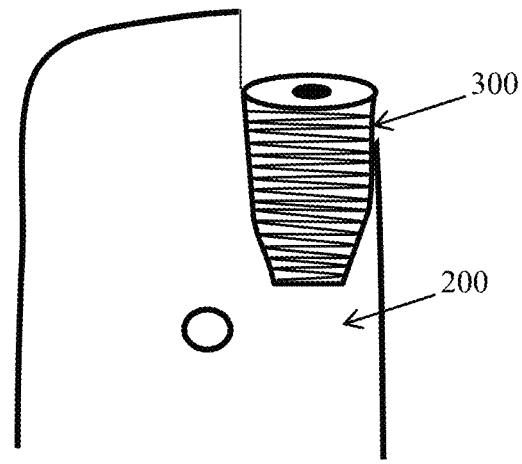
Figure 3A:
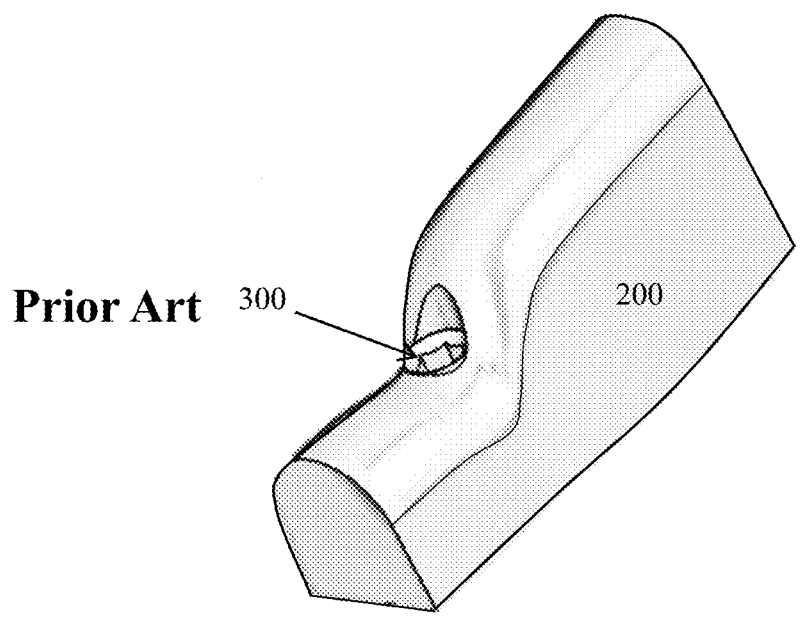
FIG. 3A illustrates a proper insertion of an implant in the lower jaw.
Figure 3B:
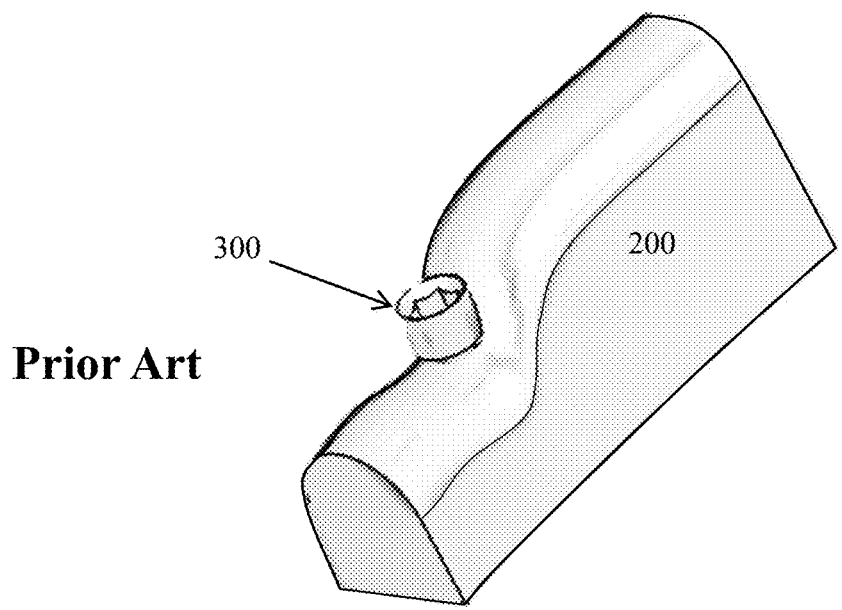
FIG. 3B illustrates one possibility of an implant displacement placement in which the implant is not fully inserted into the jawbone.

FIGS. 1A, 1B, 2A, 2B and 3B describe improper insertions of an implant (300) into a drillhole in a bone (200): in FIG. 1A, the implant (300) is not inserted all the way into the bone (200); in FIG. 1B the implant (300) is inserted too deep into the bone (200); in FIG. 2A, the implant (300) is inserted at a point where the bone is arched, which causes the implant's head to extend outwardly from the surface of the bone (200); in FIG. 12B, the implant (300) is inserted too close to the bone's edge, which causes the implant's side to be exposed and out of the bone (200); and in FIG. 3B the implant (300) is inserted into the lower jawbone, at a problematic point, namely where the bone is curved, which while using flapless surgery may leave some part of the implant undetected being outside of the bone. In such case, while using the implant-driver tool of the invention, light would be visible and indicate the surgeon to keep inserting the implant until there is no light at the implant's surroundings. In the cases illustrated in FIGS. 1A, 2A, 2B and 3B, light would be visible through the soft tissue surrounding the bone (200) and the surgeon/dentist would know that the implant is not properly inserted. As to the case illustrated in FIG. 1B, the surgeon/dentist would not reach this point, since he/she would know that the implant has reached proper depth by virtue of disappearance of the light emitted from the implant-driver tool. FIG. 3A illustrates a proper positioning of an implant at a curved bone topography: as illustrated, this is achieved as the light would first disappear on one side of the implant and the surgeon would continue to see light from the other side and would know to keep-on inserting the implant until all the light disappears.

Figure 4A:
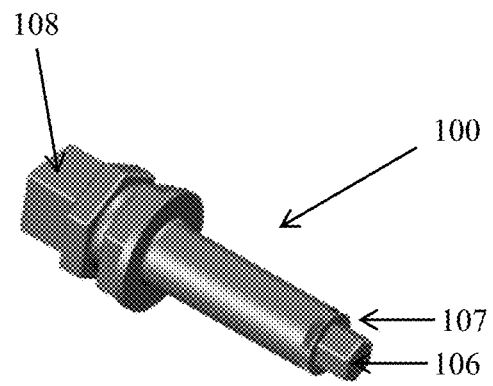
FIGS. 4A-4C describe an implant-driver tool according to the invention.
Figure 4B:
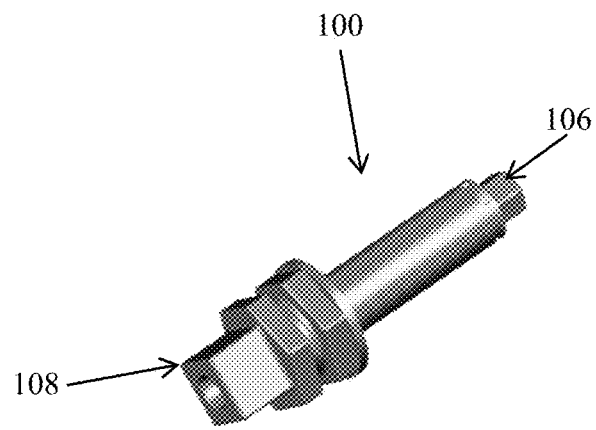
Figure 4C:
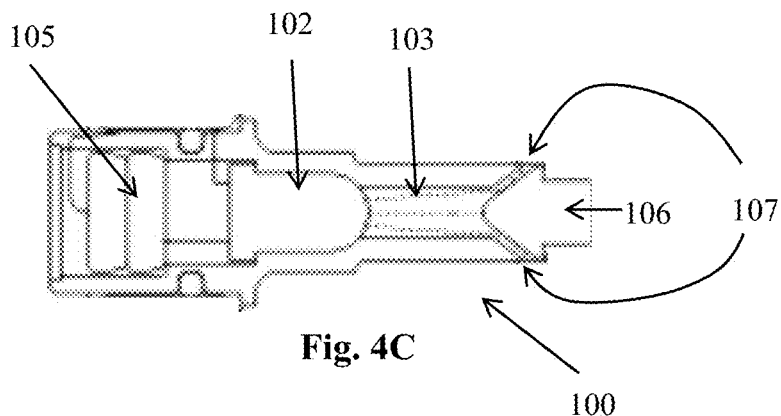
Figure 5:
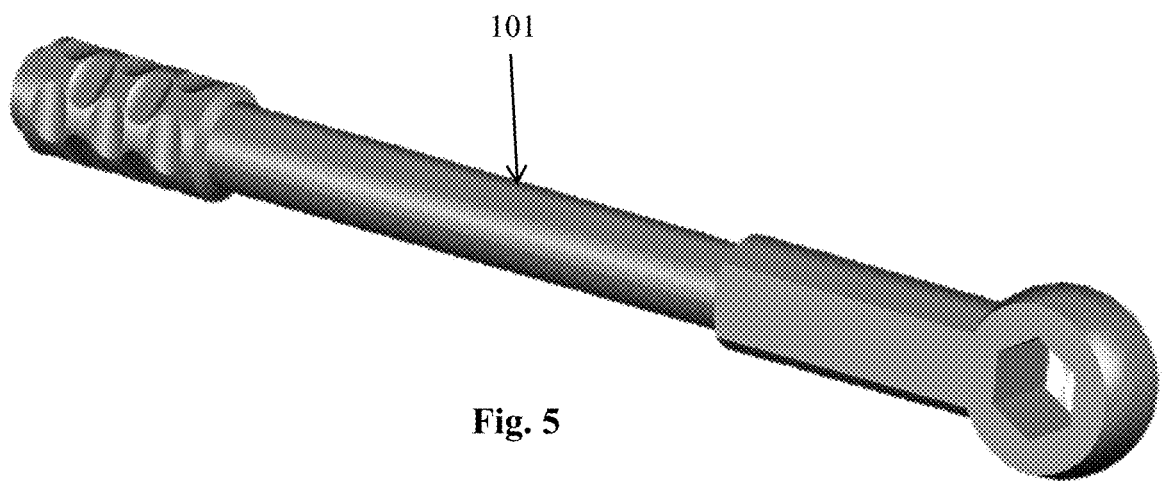
FIG. 5 illustrates a handle or ratchet to which the implant-driver tool of the invention can be connected.

FIGS. 4A-4C describe implant-driver tools (100) according to some embodiments of the invention: FIGS. 4A and 4B are 3-dimentional illustration of the tool (100) from two different sides, showing a hexagonal distal end (106) designed to fit into an implant's head for screwing thereof, as well as a square or hexagonal proximal end (108) designed to fit into a ratchet/handle (101) as illustrated in FIG. 5. It should be noted that the shape of the distal end (106) and of the proximal end (108) can vary according to need and desire, and can, e.g., elliptical, triangle, square, pentagon, hexagon, etc. The implant's head and ratchet/handle (101) are thus constructed to fit such distal- (106) and proximal- (108) ends. FIG. 4C is a cross-sectional side-view of the implant-driver tool (100), showing an internal power source (105), a light source (102), a light conduit (103) and light exit point(s) (107) from which light exits the tool.

Figures 6A, 6B:
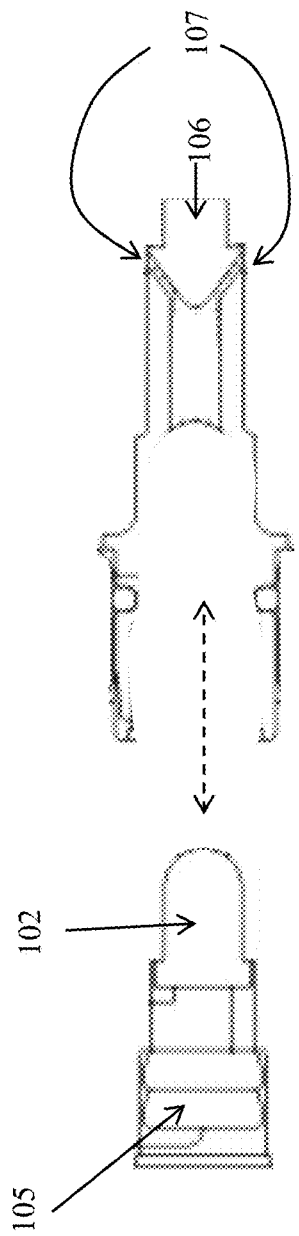
FIGS. 6A-6B describe an implant-driver tool according to another embodiment of the invention.

In certain embodiments, the implant-driver tool (100) according to any of the embodiments above is a single independent unit that can be used as is or inserted into a ratchet/handle (101). Such an independent unit may be disposable or not, in which case it may be sealed to prevent moisture, water and other contaminants from reaching the inner components, thereby enabling cleaning and disinfecting thereof using known techniques. Accordingly, in certain embodiments, the tool (100) comprises a light-transparent seal at the light exit point (107) near its distal end (106) for allowing light to exit the tool during use. Alternatively, if the tool (100) is disposable, such light-transparent seal is optional. In another alternative, and as illustrated in FIGS. 6A and 6B, the tool (100) is dismantlable, meaning that its inner components (FIG. 6A) may be removed from its outer shell (FIG. 6B) to enable cleaning and disinfecting the outer shell after each use, and/or to enable replacement of the power source (105) and/or the light source (102) if needed.

Figure 12:
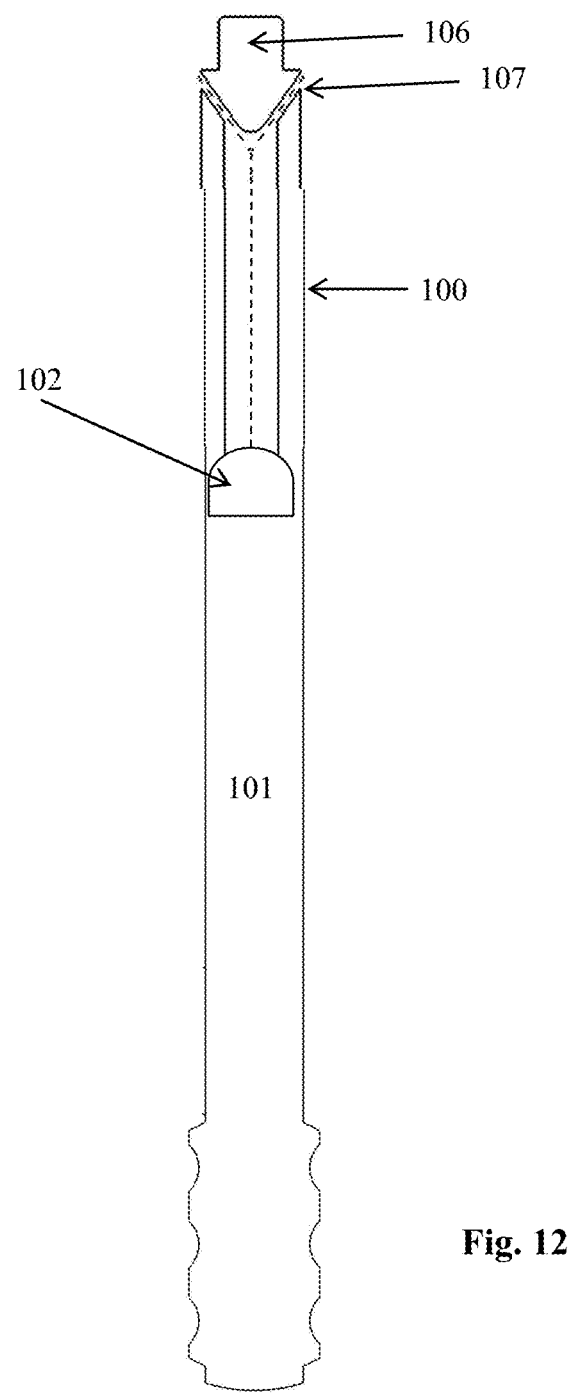
FIG. 12 illustrates yet another alternative configuration of a straight-form handle with an implant-driver tool of the invention.

FIGS. 7-11 illustrate 5 possible configurations of an implant-driver tool (100) with or connected-to a handle/ratchet (101) according to the invention. As illustrated in these figures, the implant-driver tool (100) comprises or is used together with a ratchet or handle (101) that may be rotatable (see dotted arrow illustrating the rotation direction) using a gear mechanism that translates the rotation of the handle into rotation of the implant-driver tool. The rotation of the tool (100), either by turning the tool itself or the handle/ratchet turns the implant (300) and screws it into the bone. When using such a ratchet, the dentist/surgeon can easily insert and use the tool in tight spaces and screw the implant. It is however notable, that the implant-driver tool (100) may be constructed as a standalone tool or connected to a straight rod/handle (as illustrated in FIG. 12), with or without a rotational handle (101).

Figure 8:
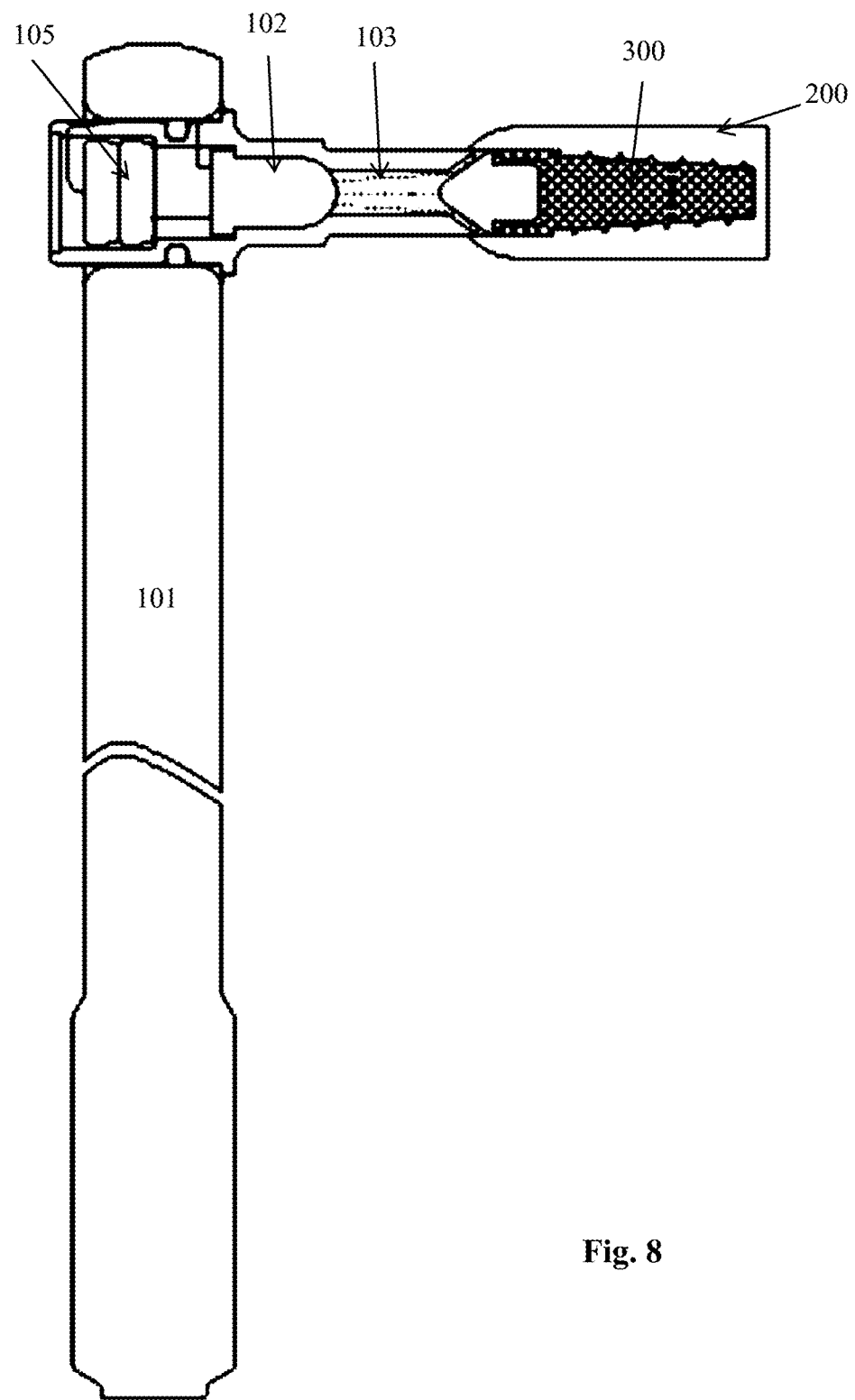
FIG. 8 illustrates the use of another implant-driver tool of the invention (now with 2 batteries instead of 3) for inserting an implant into the in a bone, when the implant has reached a desired insertion depth.
Figure 9:
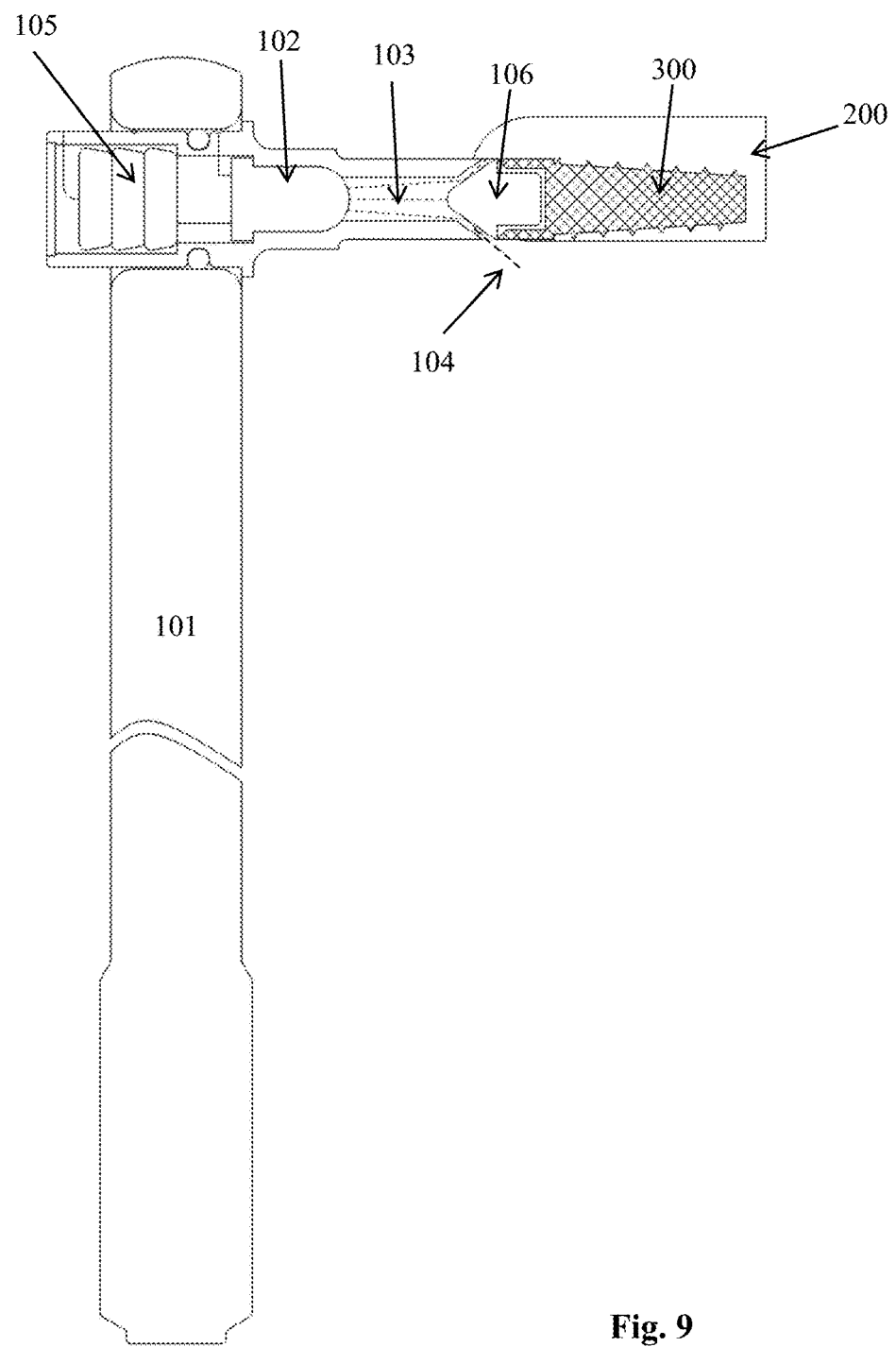
FIG. 9 illustrates an improper insertion of an implant into a drillhole in a bone, i.e., too close to the bone's edge.
Figure 10:
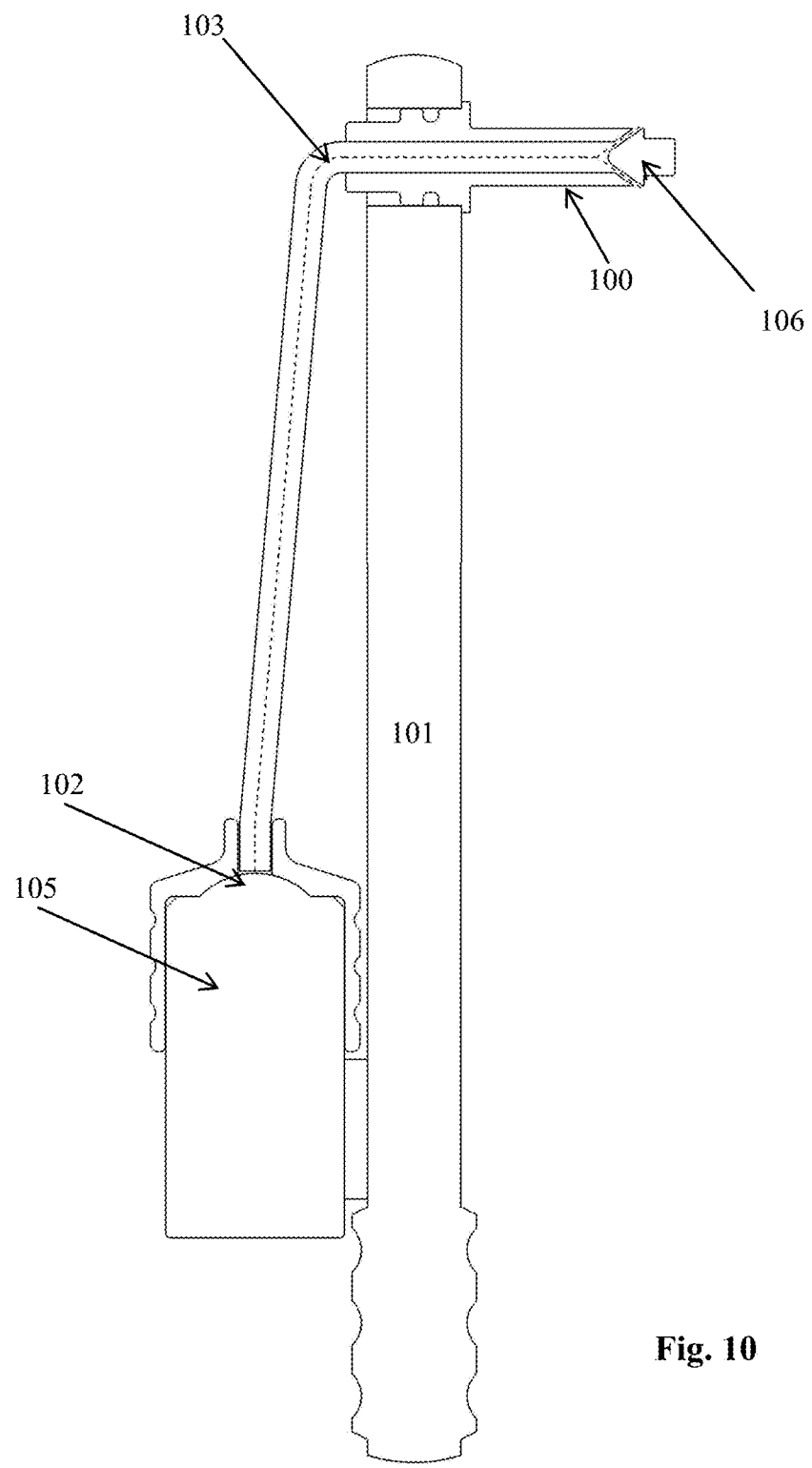
FIG. 10 illustrates an alternative configuration of an implant-driver tool of the invention, in which the power source and the light source are external to the tool's body.
Figure 11:
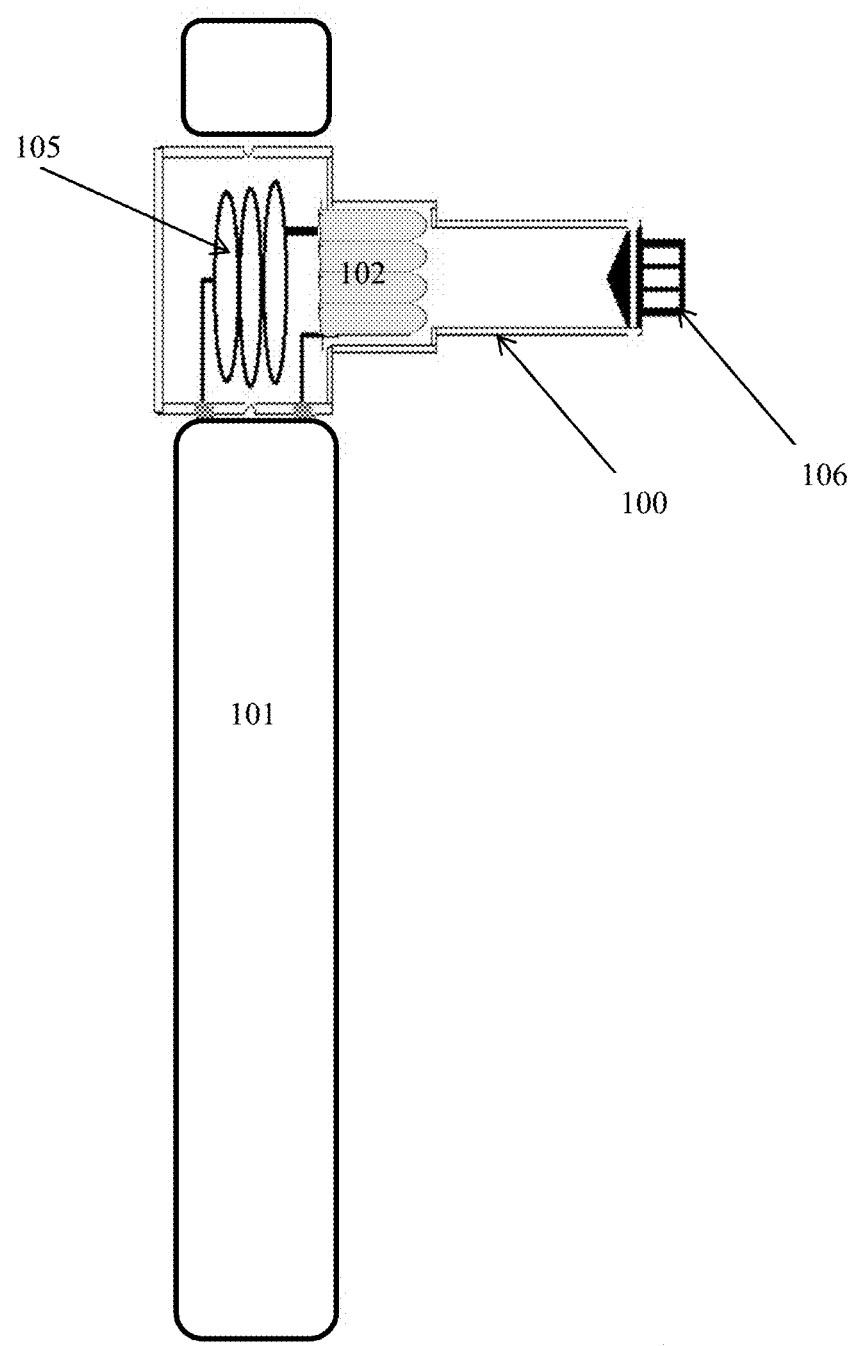
FIG. 11 illustrates yet another alternative configuration of an implant-driver tool of the invention with multiple light sources.

Also illustrated in these figures is a light source (102) and a power source (105), which can be either integral and internal as illustrated in FIGS. 7-9, 11 and 12, or external as illustrated in FIG. 10. Notably, the tool may have an external power source and an internal light source or that both the light source and the power source are external. The external unit may be connected to the outer surface of the handle/ratchet (101) or be completely separated therefrom. In addition, when the light source (102) is remote from the tool's tip that is designed to interact with the implant (300), a light conduit (103), such as an optic fiber or a hollow light-conduit tube, is used to lead the light from the light source (102) to the tool's tip.

FIG. 7 illustrates a preliminary step of insertion of an implant (300) into a drillhole in a bone (200): as seen, the implant (300) is not fully inserted into the bone (200), which leads to light scatter (dotted line—104) that exits the tool's head via dedicated openings (107) and passes through the soft tissue surrounding the bone (200), and that is visible by the surgeon/dentist. As such, as long as this light scatter (104) is visible, the dentist/surgeon knows that the implant (300) has not reached its proper depth in the drillhole.

FIG. 8 illustrates a final step of the insertion of the implant (300) into the drillhole in a bone (200): as seen, the implant (300) is fully inserted into the bone (200), which leads to the blocking of a light scatter. The surgeon/dentist, which observes the disappearance of the light, would know that the implant (300) has reached its proper depth in the drillhole/bone and would stop screwing the implant into the bone.

FIG. 9 illustrates an improper insertion of an implant (300) into a drillhole in a bone (200): as seen, although the implant (300) is fully inserted into the bone (200), the fact that it is inserted too close to the bone's edge causes a light scatter (104) that passes through the soft tissue at the side of the bone. The fact that light is visible only from one side of the bone would indicate the surgeon/dentist that the implant has been placed too close to the bone's edge and that it needs to be repositioned in a new drillhole or perform guided bone regeneration procedure. Alternatively, or in addition, the fact that the implant cannot be screwed further into the drillhole, together with the presence of a light scatter (104) would indicate the surgeon/dentist that the drillhole is not deep enough, or, when light scatter is seen from only one side of the bone, that the implant (300) is positioned too close to the bone's edge.

When a dentist/physician identifies that the implant has not been properly inserted, i.e., that the light scatter (104) has not completely disappeared, despite repeated attempts to insert/screw the implant into the drillhole, he/she can decide to either relocate the implant into a new location (into a new drillhole drilled nearby), into the same location in a newly drilled drillhole (preferably after regeneration of the drilled site), or completely abort the implantation. This reduces the risk of conducting a potentially failing implantation.

The invention claimed is:

1. An implant-driver tool for driving an implant into a bone, the tool comprising:
    a) a distal driver section mateable with said implant; and
    b) a light source and light exit points at said distal driver section, wherein said light exit points are positioned essentially immediately near a mating point between said distal driver section and said implant's head;
    c) a light conduit and a reflector within the tool, wherein said reflector is designed to alter the angle a light beam emitted from said light source before exiting the tool through said light exit points,
    wherein said light source is designed to emit light through said light conduit and reflector and via said light exit points in a forward direction of said distal driver section,
    wherein said light is emitted in the forward direction.

2. The implant-driver tool of claim 1, wherein said light exit points comprise a transparent seal that allows light to pass therethrough while preventing moisture, water and other contaminants from reaching inner components of said implant-driver tool.

3. The implant-driver tool of claim 1, wherein said light source is designed to emit light in about 360° around implant's head during its insertion into an implant-socket.

4. The implant-driver tool of claim 1, further comprising an integral power source.

5. The implant-driver tool of claim 1, further comprising a switch to turn the light on and off.

6. The implant-driver tool of claim 4, wherein said integral power source is rechargeable.

7. The implant-driver tool of claim 1, wherein said bone is a jawbone and said implant is a dental implant designed to be inserted into a drilled implant-socket in said jawbone.

8. The implant-driver tool of claim 1, wherein the implant-driver tool is disposable.

9. The implant-driver tool of claim 1, wherein:
    (i) said bone is a jawbone and said implant is a dental implant designed to be inserted into a drilled implant-socket in said jawbone; and
    (ii) said light source is designed to emit light in about 360° around implant's head during its insertion into an implant-socket.

10. The implant-driver tool of claim 9, further comprising a rechargeable integral power source.

11. An implant kit comprising:
    (i) an implant-driver tool according to claim 1; and
    (ii) at least one other implant-related tool.

12. The kit of claim 11, wherein the kit is a dental kit, and wherein said at least one other implant-related tool is one or more drills, a punch tool, one or more implants, a ratchet/handle for holding said implant-driver tool, a power source, charger, computer guided implantology, or any combination thereof.

13. The kit of claim 12, further comprising an instruction manual.

14. The kit of claim 11, wherein said implant-driver tool comprises an integral power source, and said kit further comprises a cable or charger for charging said integral power source.

15. The kit of claim 11, wherein said kit includes one or more dental implants.

* * * * *